(12) United States Patent
Marinet et al.

(10) Patent No.: US 9,379,066 B2
(45) Date of Patent: *Jun. 28, 2016

(54) DEVICE FOR DETECTING A LASER ATTACK IN AN INTEGRATED CIRCUIT CHIP

(71) Applicant: STMicroelectronics (Rousset) SAS, Rousset (FR)

(72) Inventors: Fabrice Marinet, Chateauneuf le Rouge (FR); Julien Mercier, Mimet (FR); Jimmy Fort, Puyloubier (FR); Alexandre Sarafianos, Marseilles (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 181 days.

This patent is subject to a terminal disclaimer.

(21) Appl. No.: 14/686,908

(22) Filed: Apr. 15, 2015

(65) Prior Publication Data
US 2016/0133582 A1  May 12, 2016

Related U.S. Application Data

(60) Division of application No. 14/531,025, filed on Nov. 3, 2014, now Pat. No. 9,070,697, which is a continuation of application No. 13/751,549, filed on Jan. 28, 2013, now Pat. No. 8,907,452.

(30) Foreign Application Priority Data

Feb. 8, 2012 (FR) ...................... 12 51151

(51) Int. Cl.
*H01L 29/76* (2006.01)
*H01L 23/00* (2006.01)
*H01L 27/06* (2006.01)

(Continued)

(52) U.S. Cl.
CPC .......... *H01L 23/576* (2013.01); *H01L 27/0635* (2013.01); *H01L 27/092* (2013.01); *H01L 29/7322* (2013.01); *H01L 2924/0002* (2013.01)

(58) Field of Classification Search
CPC ... H01L 29/7322; H01L 23/57; H01L 23/576; H01L 27/0635; H01L 27/092; H01L 21/8222; H01L 21/8249; H01L 21/8224; H01L 27/0716; H01L 27/0722; H01L 29/1004; H01L 29/7317
USPC .................. 257/511, 517, 526, 569, 574–576
See application file for complete search history.

(56) References Cited

U.S. PATENT DOCUMENTS 5,039,624 A   8/1991   Kadota
6,180,442 B1  1/2001   Gris (Continued)

FOREIGN PATENT DOCUMENTS

EP        2109139 A2    10/2009

OTHER PUBLICATIONS

INPI Search Report for FR 1251151 mailed Sep. 21, 2012 (2 pages).

*Primary Examiner* — Dung Le
(74) *Attorney, Agent, or Firm* — Gardere Wynne Sewell LLP

(57) ABSTRACT

A device for detecting a laser attack made on an integrated circuit chip comprises a bipolar transistor of a first type formed in a semiconductor substrate, that bipolar transistor comprising a parasitic bipolar transistor of a second type. A buried region, forming the base of the parasitic bipolar transistor, operates as a detector of the variations in current flowing caused by impingement of laser light on the substrate.

27 Claims, 2 Drawing Sheets

(51) Int. Cl.
*H01L 27/092* (2006.01)
*H01L 29/732* (2006.01)

(56) References Cited

U.S. PATENT DOCUMENTS 6,404,038 B1 6/2002 Cartagena
7,847,581 B2 12/2010 Lisart et al.
8,907,452 B2 * 12/2014 Marinet .............. H01L 29/7322
　　　　　　　　　　　　　　　　　　　　　　257/511
2001/0013610 A1 8/2001 Chi et al.
2004/0169257 A1 9/2004 Romas et al.
2005/0275027 A1 12/2005 Mallikarjunaswamy
2009/0251168 A1 10/2009 Lisart et al.
2013/0260486 A1 10/2013 Huang et al.

* cited by examiner

DEVICE FOR DETECTING A LASER ATTACK IN AN INTEGRATED CIRCUIT CHIP

CROSS REFERENCE TO RELATED APPLICATIONS

This application is a divisional of U.S. patent application Ser. No. 14/531,025 filed Nov. 3, 2014 (now U.S. Pat. No. 9,070,697), which is a continuation of U.S. patent application Ser. No. 13/751,549 filed Jan. 28, 2013 (now U.S. Pat. No. 8,907,452) which claims priority from French Application for Patent No. 1251151 filed Feb. 8, 2012, which are hereby incorporated by reference to the maximum extent allowable by law.

TECHNICAL FIELD

The present disclosure relates to the protection of an integrated circuit chip against laser attacks.

BACKGROUND

In certain secure devices such as payment cards, integrated circuit chips are likely to process and/or store critical data, for example, encryption keys. Such chips may be fraudulently manipulated in order to obtain protected confidential data.

To intentionally cause disturbances in the circuits of a chip, an attack mode comprises bombarding chip areas with a laser beam while the chip is operating. Due to the presence of interconnection metal tracks on the front surface side of the chip, laser attacks are often carried out on the back side.

To avoid fraud, chips comprising attack detection devices have been provided. The attack detection device is coupled to a chip protection circuit. When an attack is detected, the protection circuit implements certain measures of protection, modification, or destruction of the critical data. For example, it may be provided, when an attack is detected, to interrupt the power supply of the chip or to cause it to reset, in order to reduce the time during which the attacker can study the chip response to a disturbance.

Existing detection devices have various disadvantages. They require, for example, creating new structures on chip to enable the detection of a laser attack. Further, they may increase the bulk and/or the complexity of secure devices.

SUMMARY

An embodiment provides a device for detecting a laser attack in an integrated circuit chip, which overcomes at least some of the disadvantages of the above-described devices.

Thus, an embodiment provides a device for detecting a laser attack in an integrated circuit chip, formed in the upper P-type portion of a semiconductor substrate incorporating an NPN bipolar transistor having an N-type buried layer, comprising a detector of the variations of the current flowing between the base of said NPN bipolar transistor and the substrate.

According to an embodiment, the substrate comprises a substrate contact provided to be grounded, and the base contact of the NPN bipolar transistor is connected to a comparator and to a terminal of application of a bias voltage by a resistor.

According to an embodiment, the collector and the base of the NPN bipolar transistor are interconnected.

According to an embodiment, the resistor is embodied by a P-channel MOS transistor.

According to an embodiment, the comparator comprises an inverter.

According to an embodiment, the inverter comprises an N-channel MOS transistor and a P-channel MOS transistor, the gate width of the N-channel MOS transistor being at least two times smaller than that of the P-channel MOS transistor.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
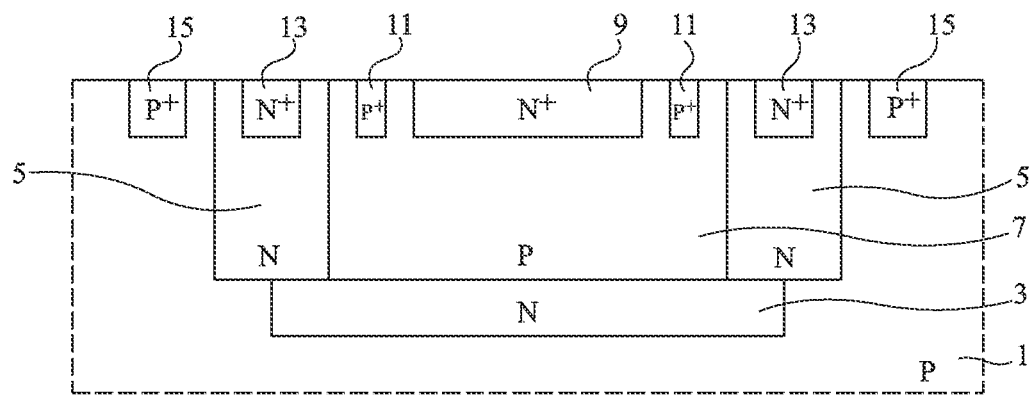
FIG. 1 is a cross-section view schematically showing a portion of an integrated circuit chip.

For clarity, the same elements have been designated with the same reference numerals in the different drawings and, further, as usual in the representation of integrated circuits, FIG. 1 is not drawn to scale.

FIG. 1 is a cross-sectional view schematically showing a portion of an integrated circuit chip comprising an NPN bipolar transistor having an N-type buried layer 3. Such a transistor is a component commonly provided in existing integrated circuit structures.

The NPN transistor is formed in the upper P-type doped portion of a semiconductor substrate 1. An N-type doped buried layer 3 and a ring-shaped wall 5, also N-type doped, which extends from the upper surface of the substrate to buried layer 3, delimit a P-type doped well 7.

A heavily-doped N-type region 9 extends at the surface and at the center of P-type well 7. Regions 11, more heavily P-type doped than well 7, extend at the surface of well 7 and surround region 9. Contact regions 13, more heavily N-type doped than regions 5, extend at the surface of regions 5.

A vertical NPN transistor with an N-type buried layer, having its emitter formed of region 9, its base formed of well 7 embedded with base contact region 11, and its collector formed of buried layer 3 connected by wall 5 to collector contact region 13, is thus obtained.

Substrate contact regions 15, more heavily P-type doped than substrate 1, extend at the surface of substrate 1 and surround regions 5. Substrate contact regions 15 are, for example, intended to be grounded.

To detect a laser attack in an integrated circuit chip of the type illustrated in FIG. 1, incorporating an NPN bipolar transistor having an N-type buried layer, the present inventors provide a detection device capable of detecting variations of the current flowing between the base of the NPN bipolar transistor and the substrate.

Figure 2A:
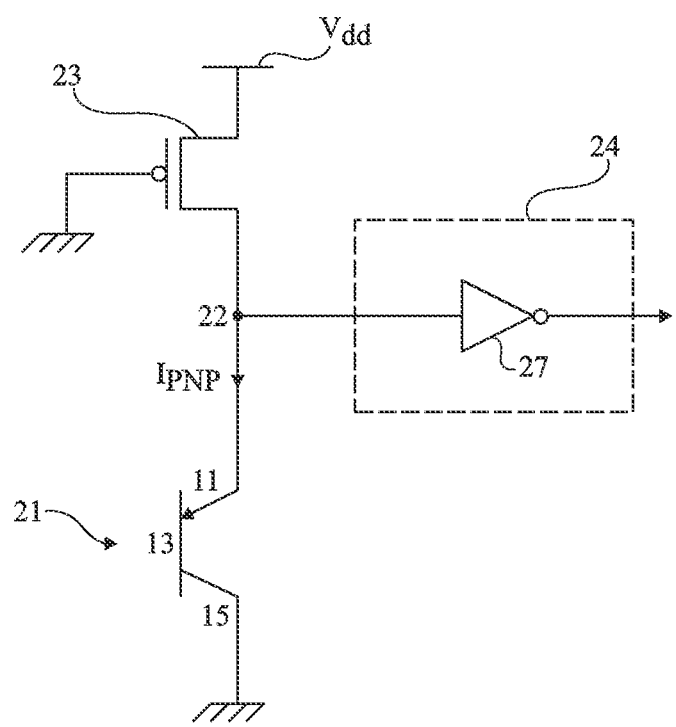
FIG. 2A is an electric diagram illustrating a device for detecting a laser attack.

FIG. 2A is an electric diagram illustrating an example of a device for detecting a laser attack.

The detection device is based on the use of a parasitic PNP bipolar transistor 21 present in an integrated circuit chip incorporating an NPN bipolar transistor having an N-buried type layer, of the type illustrated in FIG. 1. The emitter of PNP transistor 21 corresponds to P-type well 7, that is, to the base of the NPN transistor. The base of PNP transistor 21 corresponds to N-type buried layer 3, that is, to the collector of the NPN transistor. The collector of PNP transistor 21 corresponds to substrate 1. Thus, the emitter, base, and collector contacts of PNP transistor 21 approximately correspond to regions 11, 13, and 15.

Collector contact 15 of PNP transistor 21 is grounded. Base 13 of PNP transistor 21 is floating. A node 22 corresponding to emitter contact 11 of PNP transistor 21 is connected to a bias voltage $V_{dd}$ by a resistor 23. Resistor 23 may be embodied, as shown, by a transistor assembled as a resistor, for example, having a P channel, or by a current source. Node 22 is also connected to an input of a comparator 24. In the shown example, comparator 24 is formed of a simple inverter 27.

When a laser beam reaches the rear surface of the chip, electron/hole pairs are photogenerated in substrate 1. The electrons cross N-type buried layer 3 and are attracted by regions 11 connected, via resistor 23, to positive voltage $V_{dd}$. This turns on PNP transistor 21 and a current $I_{PNP}$ then flows between emitter contact 11 and collector contact 15 of PNP transistor 21. The voltage at node 22 switches from $V_{dd}$ to $V_{dd}-R*I_{PNP}$, R being the value of resistance 23. The output of comparator 24 then switches from a low level to a high level, which corresponds to a laser attack detection signal. Various measures of protection, modification, or destruction of the confidential data of the chip may then be implemented.

Figure 2B:
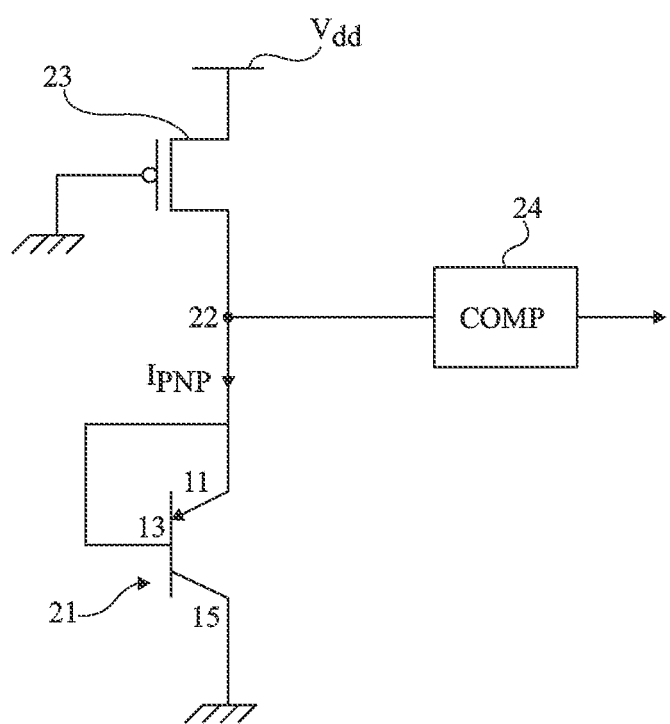
FIG. 2B illustrates a variation of FIG. 2A.

FIG. 2B illustrates a variation of the device for detecting a laser attack illustrated in FIG. 2A. Base 13 of PNP transistor 21 is connected to emitter 11 of PNP transistor 21. This enables to decrease the sensitivity of the detection device with respect to that of the detection device illustrated in FIG. 2A.

As an example of order of magnitude, in the case where resistor 23 is embodied by a P-channel MOS transistor, the gate length and width of the MOS transistor, for example, respectively range between 3 and 5 µm and between 2 and 4 µm, for example, respectively, being on the order of 4 µm and 3 µm. This corresponds to a current $I_{PNP}$ of approximately 10 µA.

In the case where comparator 24 is embodied by a simple inverter 27, the gate width of the N-channel MOS transistor of inverter 27 is selected to be small as compared with the gate width of the P-channel MOS transistor of this inverter, to avoid that a laser attack directly affects the transistors. For example, the gate width of the N-channel MOS transistor of the inverter is at least two times smaller than the gate width of the P-channel MOS transistor.

The surface of an NPN transistor of the type illustrated in FIG. 1, for example, ranges between 2 and 25 $\mu m^2$, for example, being on the order of 4 $\mu m^2$.

Tests have shown that, in the case where a laser attack is performed with a beam having a diameter of approximately 5 µm, a detection device using such NPN transistors having an N-type buried layer enables to detect this attack over a radius for example ranging between 300 and 500 µm around the impact point of the beam on the rear surface of the chip, for example, over a radius on the order of 400 µm around the impact point of the beam.

An integrated circuit chip used for the processing or the storage of critical data for example has a surface area ranging between 2 and 3 $mm^2$. To be able to detect a laser attack whatever its impact point on the chip, the present inventors provide integrating several NPN transistors having an N-type buried layer of the above-described type in the chip. An array of 20 NPN transistors having N-type buried layers, distributed in rows and in columns and spaced apart by a distance between 150 and 250 µm, is, for example, on the order of 200 µm, is, for example, formed.

An advantage of a laser attack detection device of the type described in relation with FIGS. 1, 2A, and 2B is that it can be formed by only using components commonly provided in integrated circuit chips used for the processing or the storage of critical data.

Another advantage of such a detection device is that it enables local detection of a laser attack.

Another advantage of such a detection device is that the surface area of the integrated circuit chip is almost unchanged with respect to that of a similar integrated circuit chip incorporating no laser attack detection device.

Another advantage is that the static power consumption of such a laser attack detection device is almost non-existent.

Specific embodiments have been described. Various alterations, modifications, and improvements will readily occur to those skilled in the art. In particular, instead of associating a comparator with each N-type buried layer NPN transistor, a single comparator may be used for a set of NPN transistors, if the laser attack is not desired to be accurately located.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A circuit, comprising:
   a substrate of a first conductivity type;
   a bipolar transistor of a first type having a buried region within the substrate that is formed of the second conductivity type;
   wherein the buried region is configured to operate as a detector of variation in current flow between a base of said bipolar transistor and the substrate that are indicative of a laser beam directed at the substrate.

2. A circuit, comprising:
   a substrate of a first conductivity type;
   a bipolar transistor of a first type having a buried region within the substrate that is formed of the second conductivity type;
   wherein the buried region is configured to operate as a detector of variation in current flow between a base of said bipolar transistor and the substrate that are indicative of a laser beam directed at the substrate;
   wherein the bipolar transistor includes a parasitic bipolar transistor of a second type, and wherein a base of said parasitic bipolar transistor is provided by said buried region.

3. The circuit of claim 2, further comprising a comparator circuit having an input coupled to an emitter of said parasitic bipolar transistor and having an output configured to generate a signal indicating detection of variation in current flow.

4. The circuit of claim 3, wherein the comparator circuit comprises a logical inverter circuit.

5. The circuit of claim 4, wherein the logical inverter comprises an N-channel MOS transistor and a P-channel MOS transistor, a gate width of the N-channel MOS transistor being at least two times smaller than a gate width of the P-channel MOS transistor.

6. The circuit of claim 3, further comprising a well of said first conductivity type provided in said substrate over said buried region, said well defining the emitter of said parasitic bipolar transistor.

7. The circuit of claim 6, further comprising a surface region of the second conductivity type formed in said well, the surface region forming an emitter of the bipolar transistor of the first type.

8. The circuit of claim 2, wherein a collector of said parasitic bipolar transistor is coupled to a reference voltage node.

9. The circuit of claim 8, wherein the collector of said parasitic bipolar transistor is formed by said substrate.

10. The circuit of claim 2, further comprising a bias circuit configured to supply bias current to said parasitic bipolar transistor.

11. The circuit of claim 10, wherein said bias circuit is a resistance.

12. The circuit of claim 11, wherein the resistance is embodied by a P-channel MOS transistor.

13. The circuit of claim 2, wherein a base of the parasitic bipolar transistor is coupled to an emitter of the parasitic bipolar transistor.

14. A circuit, comprising:
a substrate of a first conductivity type;
a bipolar transistor of a first type having a buried region within the substrate that is formed of the second conductivity type;
wherein the buried region is configured to operate as a detector of variation in current flow between a base of said bipolar transistor and the substrate that are indicative of a laser beam directed at the substrate;
an encircling region of the second conductivity type extending from a top surface of the substrate to contact the buried region;
a well region of the first conductivity type surrounded by said encircling region and said buried region; and
a surface region of the second conductivity type formed in said well region.

15. The circuit of claim 14, wherein the surface region, well region and buried region form said bipolar transistor of the first type, wherein the bipolar transistor includes a parasitic bipolar transistor of a second type, and wherein a base of said parasitic bipolar transistor is provided by said buried region.

16. The circuit of claim 15, further comprising a comparator circuit having an input coupled to an emitter of said parasitic bipolar transistor and having an output configured to generate a signal indicating detection of laser beam impingement.

17. The circuit of claim 16, wherein the comparator circuit comprises a logical inverter circuit including an N-channel MOS transistor and a P-channel MOS transistor, a gate width of the N-channel MOS transistor being at least two times smaller than a gate width of the P-channel MOS transistor.

18. The circuit of claim 15, wherein the surface region defines an emitter of the bipolar transistor.

19. The circuit of claim 15, wherein the well region defines a base of the bipolar transistor and an emitter of the parasitic bipolar transistor.

20. The circuit of claim 15, wherein the buried region defines the collector of the bipolar transistor and a base of the parasitic bipolar transistor.

21. The circuit of claim 15, wherein the substrate defines the collector of the parasitic bipolar transistor.

22. The circuit of claim 1, further comprising:
a substrate contact configured to be coupled to a ground voltage; and
a comparator having an input coupled to the base, said input further coupled to receive a bias voltage.

23. The circuit of claim 22, further comprising a resistor coupled to the second input of the comparator.

24. The circuit of claims 23, wherein the resistor is embodied in a p-channel MOS transistor.

25. The circuit of claim 22, wherein said comparator is an inverter circuit.

26. The circuit of claim 25, wherein the inverter circuit comprises an n-channel MOS transistor and p-channel MOS transistor, wherein a gate width of the n-channel MOS transistor is at least twice smaller than a gate width of the p-channel MOS transistor.

27. The circuit of claim 1, wherein a collector of the bipolar transistor is directly connected to said base.

\* \* \* \* \*